US008243126B2

(12) United States Patent
Louwsma et al.

(10) Patent No.: US 8,243,126 B2
(45) Date of Patent: Aug. 14, 2012

(54) INCREASE OF PERCEIVED RESOLUTION FOR A DUAL VIEW DISPLAY DEVICE

(75) Inventors: Hendrik Louwsma, Heelen (NL); Nadine Offermans-Knooren, Ubachsberg (NL)

(73) Assignee: Chimei Innolux Corporation, Miao-Li County (TW)

( * ) Notice: Subject to any disclaimer, the term of this patent is extended or adjusted under 35 U.S.C. 154(b) by 1422 days.

(21) Appl. No.: 11/686,053

(22) Filed: Mar. 14, 2007

(65) Prior Publication Data

US 2008/0224969 A1 Sep. 18, 2008

(51) Int. Cl.
*H04N 13/04* (2006.01)

(52) U.S. Cl. .............. 348/53; 348/51; 348/54; 359/462; 349/15; 349/106; 349/110

(58) Field of Classification Search .................... 348/51, 348/53, 54; 359/462; 349/15, 106, 110
See application file for complete search history.

(56) References Cited

U.S. PATENT DOCUMENTS

| | | | | |
|---|---|---|---|---|
| 4,740,782 | A * | 4/1988 | Aoki et al. | 345/92 |
| 6,445,406 | B1 * | 9/2002 | Taniguchi et al. | 348/51 |
| 6,597,420 | B2 * | 7/2003 | Kim et al. | 349/106 |
| 7,834,943 | B2 * | 11/2010 | Louwsma | 349/15 |

* cited by examiner

*Primary Examiner* — Yves Dalencourt
(74) *Attorney, Agent, or Firm* — Thomas|Kayden

(57) ABSTRACT

A representative display device for displaying a first and a second view (V1, V2) incorporates a color generating layer a barrier layer, and a light source. The color generating layer includes a plurality of color elements arranged in a two-dimensional array extending in a plurality of rows in a horizontal direction (X) and a plurality of columns in a vertical direction (Y). The color elements include at least red, green and blue color. The light source is arranged such that, during use, light generated by the light source may pass through an arrangement of the barrier layer and the color elements of the color generating layer. The barrier layer is a straight barrier including a barrier pattern of blocking structures and openings, and is arranged for providing the viewing angle of the first view and the viewing angle of the second view. The color generating layer exhibits a row-rotation arrangement of the color elements.

17 Claims, 6 Drawing Sheets

INCREASE OF PERCEIVED RESOLUTION FOR A DUAL VIEW DISPLAY DEVICE

FIELD

The present invention relates to dual view display devices.

BACKGROUND

Pixel matrix display devices are known that comprise a number of pixel elements, usually arranged in an orthogonal matrix formation, wherein each pixel element is controlled individually to be illuminated or not. By selectively controlling each pixel, an image may be created.

A flat panel pixel matrix display, such as a liquid crystal display (LCD) or an organic light emitting diode (OLED) display, can function as a dual view display, in which a first view can be generated along a first viewing angle range and a second view can be generated along a second viewing angle range. Such a dual view display is capable of generating two different views at the same time by assigning one half of the pixels of the pixel matrix to the first view and another half of the pixels of the pixel matrix to the second view.

A dual view display is used, for example, in an automotive application that can be used simultaneously by a driver and a passenger. In such an application, the driver will see the first view, which for example shows parameters of the automobile such as a route navigation display. The passenger may see a second view, for example a TV broadcast or a video.

A well-known method to obtain two views from a single pixel matrix display is the application of a single straight barrier, which includes vertical openings in an otherwise opaque barrier layer. The vertical openings extend substantially continuously along the vertical length of the pixel matrix. However, such a solution to obtain dual views from a single pixel matrix is adversely affected by a relatively poor horizontal resolution.

To solve the poor resolution, so-called stepped barriers are applied. A particular application is the so-called double stepped barrier arrangement (double barrier). Such a double barrier comprises a first barrier layer below and a second barrier layer above the pixel matrix. The barrier layers comprise two-dimensional patterns that allow the first and second views to be generated by the pixel matrix while using a single light source.

It has been found that the use of a double barrier is relatively complex and adversely affects the construction of the dual view display. Construction of such a double barrier requires two relatively thin glass plates, which results in relatively higher costs for the display. Additionally, due to the presence of these two thin glass plates, the variations of thickness of each glass plate must be less than for thickness variations of a single glass plate to obtain a view with similar optical properties as for a single barrier construction. Also, thinner glass plates are more prone to fracture and damage. For these reasons, dual view displays are preferably constructed by means of a single barrier layer.

SUMMARY OF THE INVENTION

An embodiment of a display device for displaying a first view (V1) and a second view (V2), wherein the first view and the second view having respectively a first and a second horizontal viewing angle, comprises: a color generating layer, a barrier layer, and a light source; the color generating layer comprising a plurality of color elements arranged in a two-dimensional array extending in a plurality of rows in a horizontal direction (X) and a plurality of columns in a vertical direction (Y); the color elements comprising at least red, green and blue color; the light source being arranged such that, during use, light generated by the light source may pass through an arrangement of the barrier layer and the color elements of the color generating layer; the barrier layer being a straight barrier, comprising a barrier pattern of blocking structures and openings, and being arranged for providing the viewing angle of the first view and the viewing angle of the second view, and the color generating layer having a row-rotation arrangement of the color elements.

An embodiment of a method for manufacturing a display device for displaying a first view (V1) and a second view (V2), wherein the first view and the second view having a respective horizontal viewing angle, comprises: providing a color generating layer, a barrier layer, and a light source; the color generating layer comprising a plurality of color elements arranged in a two-dimensional array extending in a plurality of rows in a horizontal direction (X) and a plurality of columns in a vertical direction (Y); the color elements comprising at least red, green and blue color; arranging the light source in such a way that, during use, light generated by the light source may pass through an arrangement of the barrier layer and the color elements of the color generating layer; providing in the barrier layer a straight barrier pattern of blocking structures and openings, the barrier layer being arranged for providing the viewing angle of the first view and the viewing angle of the second view; and arranging the color elements in the color generating layer in a row-rotation arrangement.

BRIEF DESCRIPTION OF DRAWINGS

Below, the invention will be explained with reference to some drawings, which are intended for illustration purposes only and not to limit the scope of protection which is defined in the accompanying claims.

DETAILED DESCRIPTION

Figure 1A:
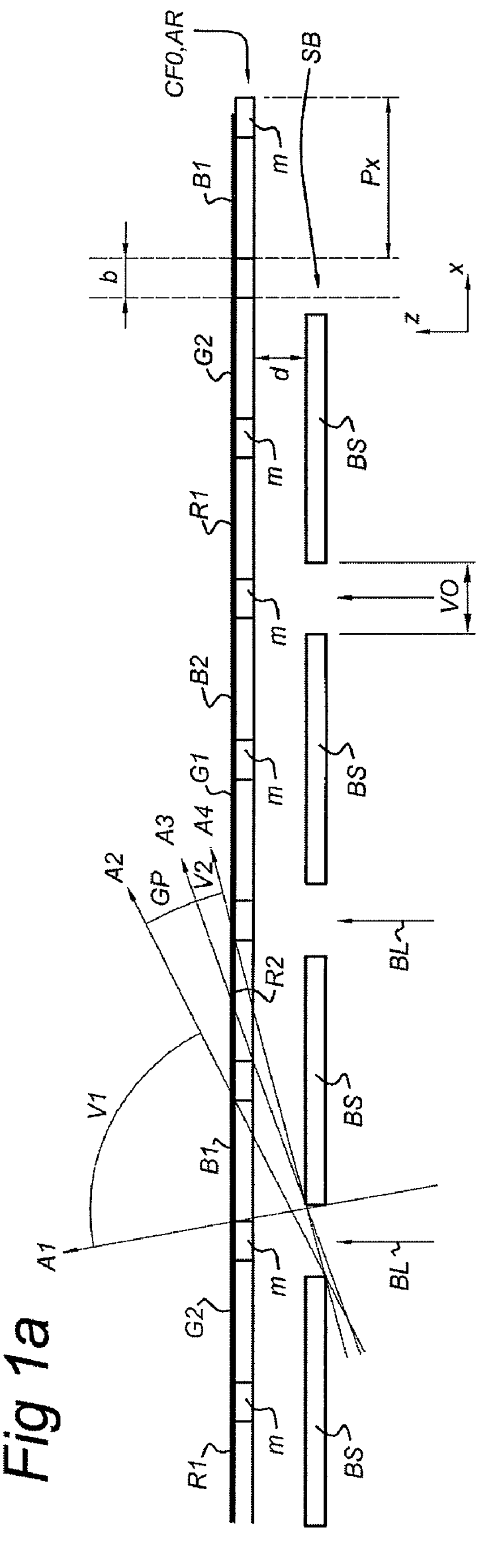
FIGS. 1*a* and 1*b* depict a cross-section of a dual view display using single barrier technology, and a detail of the cross-section, respectively.

FIG. 1*a* depicts a cross-section of a dual view display using single barrier technology. The dual view display D1 shown here, using a single barrier, is an LCD type display and comprises a color filter plate CF0, the single barrier SB, and a backlight BL. The cross-section shown here is taken along a horizontal direction X of the display. For ease of explanation, the polarizers and LC (liquid crystal) elements are not indicated here.

The single barrier SB is arranged in a height direction Z between the backlight BL and a side of the color filter plate CF0 facing the backlight. The single barrier SB may comprise a transparent carrier plate (such as a glass plate, not shown here) on which the structure of blocking elements BS is arranged. The blocking elements BS are separated from each other by openings VO.

The color filter plate CFO comprises a transparent carrier plate on which a sequence of transparent color elements is arranged. The color elements comprise red elements R, green elements G and blue elements B, which are configured to generate light of a red color (R), green color (G) or blue (B) color respectively, when light from the backlight BL passes through the respective color element. Next to the color filter plate CF0, an array plate AR is arranged, comprising array metals M (i.e., metallic connection line and/or metallic light shield).

In FIG. 1*a*, the array plate AR is located between the color filter plate CF0 and the backlight BL. Alternatively, the array plate may be located at the side of the color filter plate CF0 that is not facing the backlight BL. The present invention is applicable for both configurations of array plate AR and color filter plate CF0.

Figure 1B:
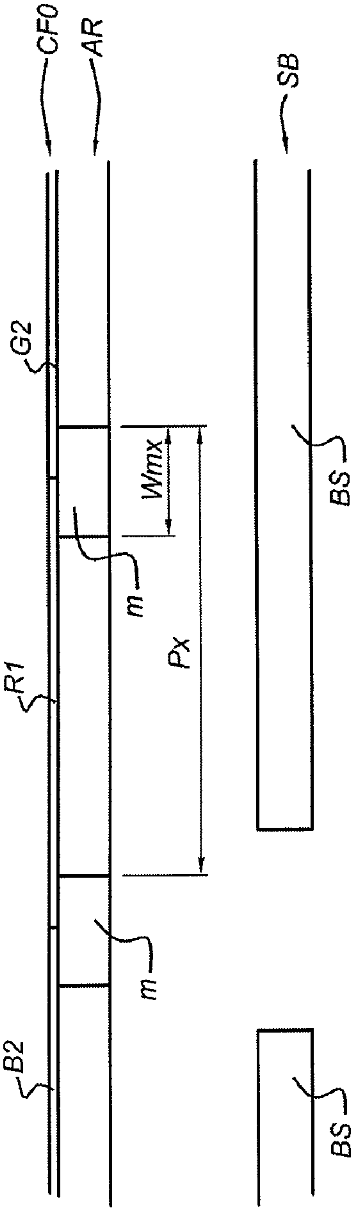

FIG. 1*b* shows the arrangement of array plate AR and color filter plate CF0 in more detail. The opaque metallic connection line M and/or metallic light shield M are positioned in such a way that the color elements R, G, B appear to be separated from each other by a non-transparent interface area, which corresponds to the metallic connection line M and/or metallic light shield M. The color elements R, G, B extend in columns along a vertical direction Y and relate to sub-pixel elements which are in combination as a pixel element of the display comprising at least a red, a green and a blue element. The R-G-B color elements are dedicated to either a first view V1 or a second view V2.

In FIG. 1*a*, color elements indicated by R1, G1, B1 are dedicated to the first view, while color elements indicated by R2, G2, B2 are dedicated to the second view. Note that due to the geometry of the barrier and the required views, pixels are paired in an interleaved manner. In FIG. 1*a*, red color element R1 for the first view is adjacent to green element G2 for the second view. Green element G2 is next to blue element B1 for the first view. The blue element B1 is next to red element R2 for the second view V2. The red color element R2 for the second view is adjacent to green element G1 for the first view. Green element G1 is next to blue element B2 for the second view. Blue element B2 is next to a next red element R1 for the first view V1. This pattern R1-G2-B1-R2-G1-B2 is repeated along the direction X.

A horizontal pitch Px of the color element including a horizontal width Wmx of one metal connection line M is indicated. Note that the configuration of the single barrier SB is such that the horizontal width of one blocking structure BS plus one opening VO equals two times the horizontal pitch Px: VO+BS=2*Px.

As illustrated by arrows A1, A2, color element B1 contributes to the first view under first viewing angle V1. The color element R2 adjacent to B1 contributes to the second view under second viewing angle V2 as illustrated by arrows A3, A4.

Note that either a gap GP or an overlap may occur between the viewing angles V1 and V2 (between arrow A2 and arrow A3) depending on the actual design of the single barrier. In case of the occurrence of a gap, no cross-talk between the first and second view exists.

Not shown in this cross-section, for reason of clarity, is a light-switching layer which comprises light switching elements that are individually associated with a single color element for controlling transmission of light through that single color element.

Light switching elements may be LC elements which, under control of an electric signal, can set to either an opaque state or a transparent state or to one or more intermediate semi-transparent states. Each LC element typically comprises a layer of liquid crystal material and a thin film transistor (TFT) circuit for controlling the state of the liquid crystal layer. Each light switching element is arranged next to the associated single color element on the color filter plate CF0 (i.e. in the path of the light passing through the color element). Each metal connection line M (that extends in a vertical direction Y perpendicular to the plane of drawing) is coupled to a series of TFT circuits.

Also not shown in this cross-section are first and second polarizing layers. The first polarizing layer is located as a first outer layer between backlight BL and the single barrier SB, and the second polarizing layer is located above the color filter plate CF0.

Figure 2A:
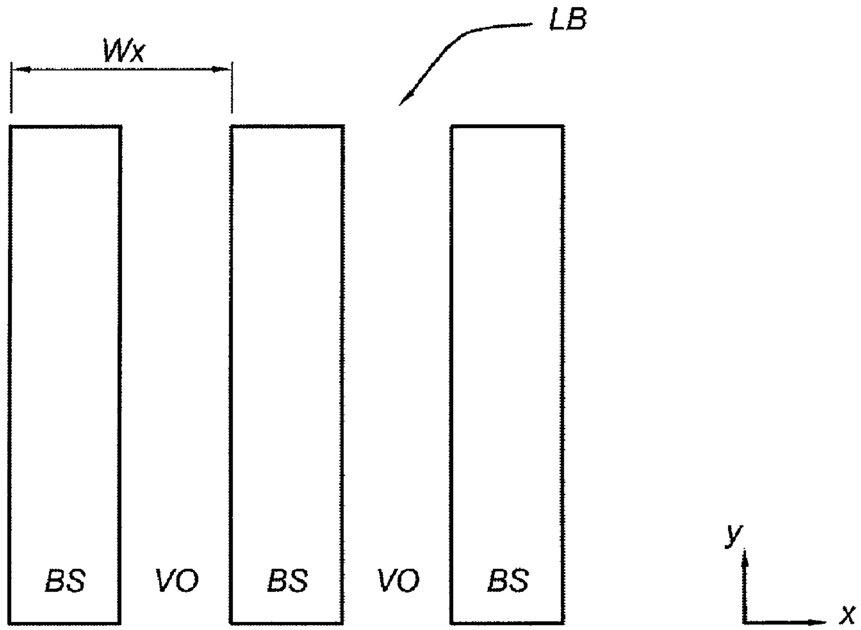
FIGS. 2*a* and 2*b* depict a top view of a straight barrier and a top view of an associated color filter.

FIG. 2*a* depicts a top view of a straight barrier LB. A straight barrier layer LB comprises a two dimensional pattern that includes vertical openings VO in between opaque blocking stripes BS. The straight barrier can be used as single barrier SB as shown in FIGS. 1*a* and 1*b*.

The vertical openings VO and blocking stripes BS of the straight barrier LB extend substantially continuous along the vertical direction Y of the pixel matrix. The horizontal barrier pitch Wx of the straight barrier is equal to the width of one vertical blocking stripe BS plus one vertical opening VO and corresponds to two times the horizontal sub-pixel pitch Px of one color element as described above.

Figure 2B:
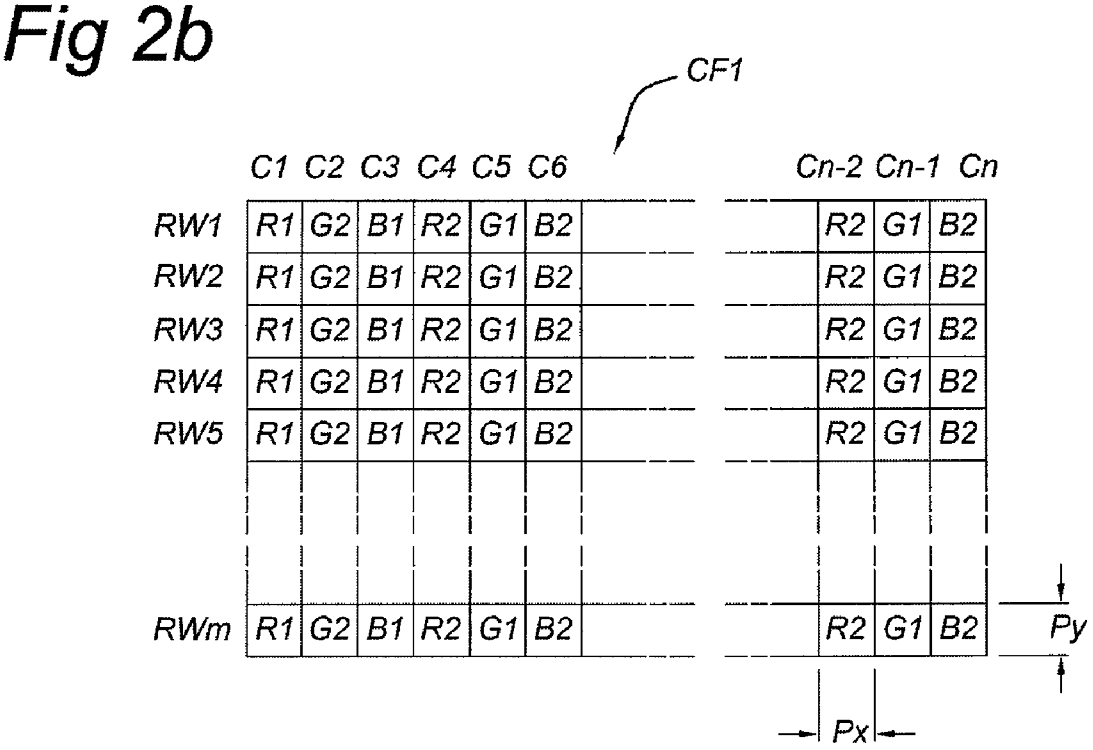

FIG. 2*b* depicts a top view of a first color filter plate CF1. The first color filter CF1 can be used as the color filter plate CF0 shown in FIGS. 1*a* and 1*b*. In the color filter plate CF1, the color elements R, G, B are arranged in m rows Rw1, Rw2, Rw3, Rw4, Rw5, . . . Rwm and n columns C1, C2, C3, C4, C5, C6, . . . , Cn−2, Cn−1, Cn. The matrix comprises a plurality of red (R), green (G) and blue (B) color stripes C1, C2, C3, C4, C5, C6, . . . , Cn−2, Cn−1, Cn adjacent to each other in the horizontal direction X, while each color stripe extends along the vertical direction Y. The horizontal pitch Px and the vertical pitch Py of each color element are indicated for one color element.

In each row, due to the geometry of the barriers and the required views, pixels of red, green and blue are paired in an interleaved manner, as explained with reference to FIGS. 1*a* and 1*b*. Thus, in each row, the same color sequence is found.

In each color element, an index is shown which relates to the color R, G, or B and to the view to which the color element contributes (View V1: index 1, view V2: index 2). For example R1 is a color element of red color contributing to view V1, G2 is a color element of green color contributing to view V2.

Figure 3A:
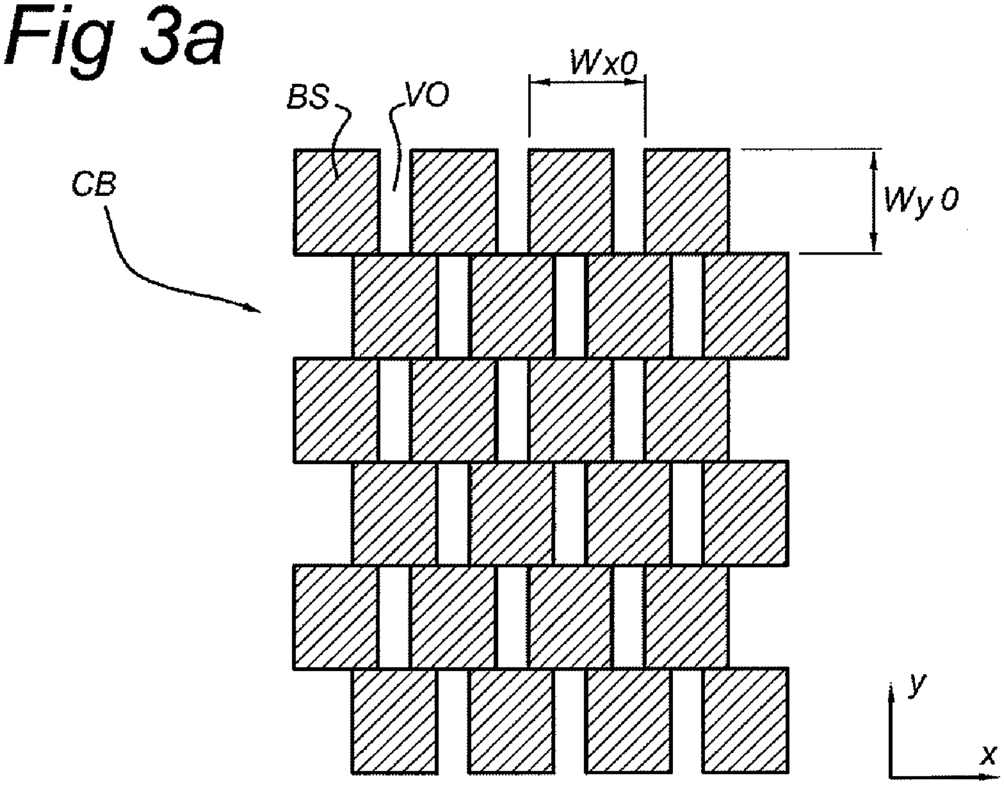
FIGS. 3*a* and 3*b* depict a top view of a shifted barrier and a top view of an associated second color filter.

FIG. 3*a* depicts a top view of a shifted barrier CB. The shifted barrier CB is a single barrier layer capable of providing Dual view in the horizontal direction. The shifted barrier CB can be used as single barrier SB as shown in FIGS. 1*a* and 1*b*.

Blocking structures BS are indicated by dark area and openings VO in the barrier layer CB are indicated by light areas. The blocking structures are arranged in rows of a vertical width Wy0. In each row, the blocking structures and openings are shifted stepwise in the horizontal direction X over half of a horizontal pitch Wx0. The horizontal pitch Wx0 is equal to the width of one blocking structure BS plus one opening VO and corresponds to two times the horizontal pitch Px as described above.

The vertical width Wy0 of a row is substantially equal to a vertical width Py of a single color element R1, R2, G1, G2, B1, B2 (sub-pixel) including a vertical width of one intermediate metal connection line (or light shield line) running in the horizontal direction. In FIG. 3*a*, the vertical width of the openings VO is substantially equal to the vertical width Wy0 of a row.

Figure 3B:
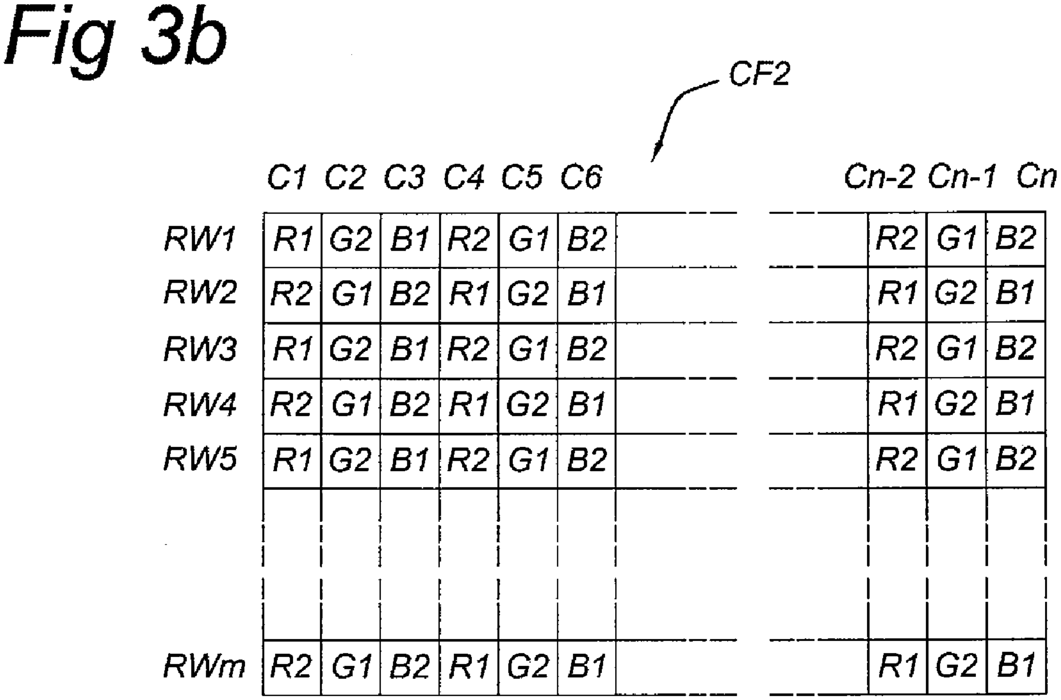

FIG. 3*b* depicts a top view of a second color filter plate CF2. The second color filter plate CF2 can be used as the color filter plate CF0 as shown in FIGS. 1*a* and 1*b*. In the second color filter plate CF2, the color elements R, G, B are arranged in m rows Rw1, Rw2, Rw3, Rw4, Rw5, . . . Rwm and n columns C1, C2, C3, C4, C5, C6, . . . , Cn−2, Cn−1, Cn. In this example, the number of rows m is an even number, but may also be an odd number.

The second color filter is similar to the first color filter in that each color stripe extends along the vertical direction Y. Basically, the first and second color filters are identical in the arrangement of the color elements, the difference between the first and second color filters relates to the respective pixel assignment for the two views.

Due to the geometry of the barrier and the required views, pixels of red, green and blue are paired in an interleaved manner, as explained with reference to FIGS. 1*a* and 1*b*. However, due to the use of a shifted barrier CB, color elements in odd rows in the same column contribute to one view (e.g., the first) while the color elements in the even rows of the same column contribute to the other view (e.g., the second). This is indicated by the index of the color elements.

Figure 4A:
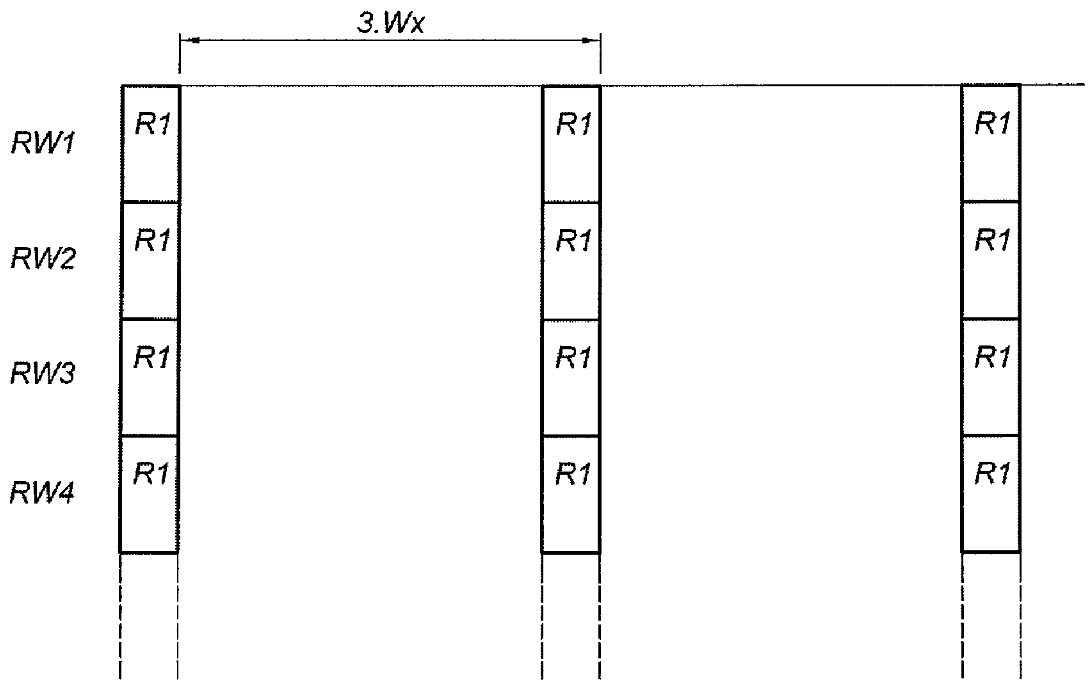
FIGS. 4*a* and 4*b* depict a perceived horizontal resolution of a dual view display using the straight barrier and the shifted barrier, respectively.
Figure 4B:
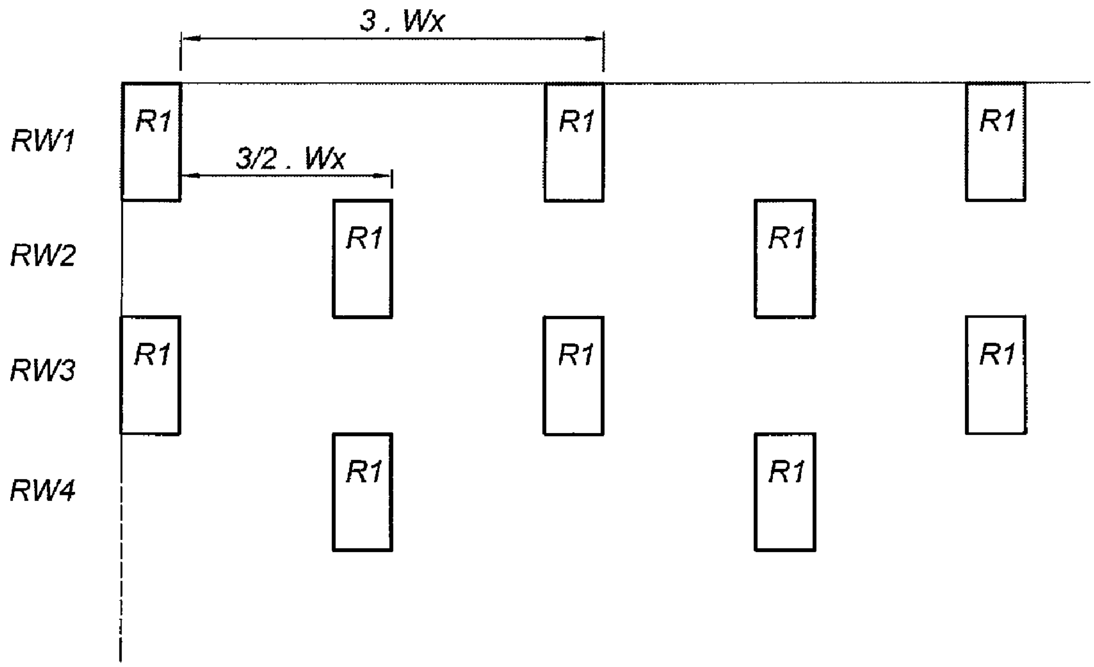

FIGS. 4*a* and 4*b* depict a perceived resolution of a combination of the straight barrier LB and the first color filter CF1 and a combination of the shifted barrier CB and the second color filter CF2 respectively. In FIGS. 4*a* and 4*b*, a comparison of the perceived resolution between the straight barrier LB and the shifted barrier CB is shown. For clarity, the comparison is shown for an example wherein only red color elements (marked R1) of the first view V1 are in the illuminated state (ON state).

In a combination of the first color filter plate CF1 and the straight barrier LB, color elements within the same vertical column can contribute to the same view, thus to either the first view V1 or the second view V2. For example, in a column C1 of red color elements, all red color elements can contribute to the red component of the first view V1.

In a combination of the second color filter plate CF2 and the shifted barrier CB, color elements are to be addressed in a different manner; color elements within one vertical column contribute to either the first view V1 or the second view V2, depending on the row the color elements are in.

For example, red color elements within the same column C1 and with an odd row Rw1, Rw3, Rw5, contribute to the red component of the first view V1, while red color elements in the same column C1 but in the even rows Rw2, Rw4 contribute to the red component of the second view V2. Red color elements in column C4 and odd rows Rw1, Rw3, Rw5 contribute to the second view V2, and red color elements in column C4 and even rows Rw2, Rw4 contribute to the first view V1.

In FIG. 4*a*, a perceived horizontal resolution of the combination CF1+LB of the straight barrier LB and the first color filter plate CF1 is shown for red color elements of the first view V1 (sub-pixels R1 of the first view V1). The horizontal spacing between sub-pixels R1 of the first view V1 corresponds to three times the horizontal pitch Wx of the straight barrier LB.

In FIG. 4*b*, a perceived horizontal resolution of the combination CF2+CB of the shifted barrier CB and the second color filter plate CF2 is shown for red color elements of the first view V1 (sub-pixels R1 of the first view V1). Due to the shifted addressing of sub-pixels between odd and even rows in the shifted barrier, the horizontal spacing between sub-pixels R1 of the first view V1 corresponds to 1.5 times the horizontal pitch Wx of the straight barrier LB.

A comparison of FIGS. 4*a* and 4*b* shows that the distribution of the red sub-pixels R1 differs for the straight barrier and shifted barrier case. For the shifted barrier CB, the pixels are much more homogeneously distributed than for the straight barrier case with a horizontal spacing of three times Wx between sub-pixels R1 in adjacent rows. An observer would perceive a higher resolution for the shifted barrier compared to the straight barrier, though the used number of pixels is identical.

However, the illustration shown here of the relatively improved horizontal resolution for the combination CF2+CB of shifted barrier and second color filter plate CF2 relates to a condition for light that is transmitted substantially perpendicularly (i.e., light rays that are directed substantially along the X-Z plane that is normal to the plane of the shifted barrier CB). Light that is transmitted in a vertically oblique direction (under an oblique angle with the X-Z plane) will pass through color elements assigned to the second view (which color elements are in the rows below and above the color elements that contribute to the first view).

It should be appreciated that as a consequence, depending on the vertical viewing angle an observer would observe the image of the first view V1 (at relatively small oblique angles with the X-Z plane) or a mix of the second view V2 and the first view V1 (at relatively larger oblique angles with the X-Z plane) for the combination of the second color filter CF2 and the shifted barrier CB.

Note that for the conventional case for the combination CF1+LB of the straight barrier LB and the first color filter CF1, the sub-pixels for one view are assigned per column, and thus no cross-talk in the vertical direction is observed. Such a situation of cross-talk in the vertical direction between the first and second view is undesirable for dual view applications, in particular for automotive applications where cross-talk can adversely affect traffic safety.

To avoid a cross-talk in vertical direction between the first view and the second view, it may be suggested to reduce the vertical aperture Wy0 of the openings VO in the shifted barrier CB. However, a reduction of the vertical aperture Wy0 would also reduce the light output, which in dual view displays is already relatively low in comparison to conventional view displays. The present invention provides other solutions to enhance the perceived resolution of the dual view display. In this regard, it is recognized that a higher perceived resolution may be obtained by a combination of the straight barrier and a row-rotated color filter CF2 in which the color elements are in a row-rotated order. As will be explained below, a relatively higher perceived resolution than the combination of the straight barrier LB and the first color filter CF can be reached, while at the same time the light output remains substantially the same and substantially no cross-talk is generated in vertical direction between the first view V1 and the second view V2.

Figure 5:
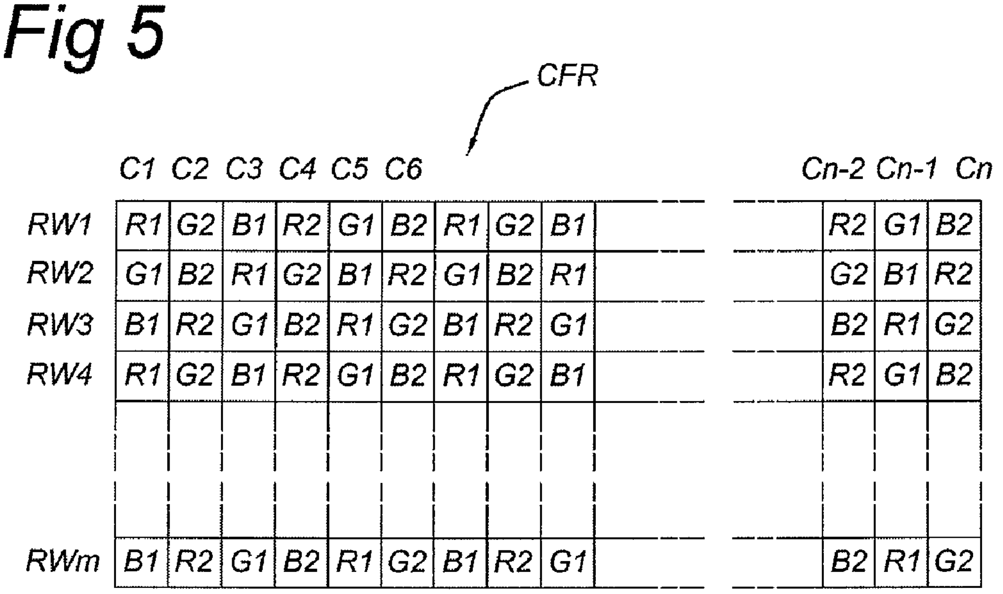
FIG. 5 depicts an embodiment of a color filter.

FIG. 5 depicts an embodiment of a row-rotated color filter plate CFR. The row-rotated color filter CFR can be used as a replacement for the color filter CF0 shown in FIGS. 1*a* and 1*b*, for example.

The row-rotated color filter CFR is arranged as a matrix of color elements arranged in m rows Rw1, Rw2, Rw3, Rw4, . . . , Rwm and n columns C1, C2, C3, C4, C5, C6, . . . , Cn−2, Cn−1, Cn. In the row-rotated color filter CFR of FIG. 5, in each row Rw1, Rw2, Rw3, Rw4, . . . Rwm red, green and blue color elements alternate in an interleaved row sequence R1, G2, B1, R2, G1, B2 that is similar as in the first and second color stripe color filter plates CF1, CF2 so as to be capable of generating a dual view of a first view V1 and a second view V2.

As a row-rotation mechanism, in the row-rotated color filter CFR, the sub-pixels of a row are shifted one position to the left in comparison to the adjacent row above that row. For example, the sub-pixels of second row Rw2 are shifted one position to the left in comparison to their positions in first row Rw1, in such a way that a green sub-pixel in second row Rw2 is vertically below a red sub-pixel in first row Rw1.

Likewise, the sub-pixels of third row Rw3 are shifted one position to the left in comparison to their positions in second row Rw2, in such a way that a blue sub-pixel in third row Rw3 is vertically below a green sub-pixel in second row Rw2.

In the odd columns C1, C3, C5, . . . , Cn−1 a first columnar sequence of color elements assigned to one view is defined (e.g., R1-G1-B1 of the first view V1), while in the even columns C2, C4, C6, . . . , Cn−2, Cn, a second columnar sequence of color elements assigned to the other view (e.g., R2-G2-B2 of the second view V2) is defined.

It is noted that the columnar sequence may be different from the one described above. Instead of the . . . -R-G-B- . . . sequence given above it is possible that the sequence is for example . . . -R-B-G- . . . Also, the sub-pixel may be shifted to the right instead of to the left. Furthermore, it should be appreciated that the sub-pixel order shown in the first row Rw1 is an example and may be different from the one shown in FIG. 5.

Moreover, it is noted that in other embodiments, the color filter plate may comprise at least one additional color element next to the red, green and blue color elements, for example, a white sub-pixel next to the red, green and blue color elements. It should be appreciated that for such color element arrangements, a dual view display can be constructed using a straight barrier and a row-rotated color filter comprising red, green, blue and at least one additional color elements. In that case, the columnar color element sequence in each column is extended with the at least one additional color element. Again, odd columns are assigned to one of the two views and even columns are assigned to the other of the two views.

Figure 6:
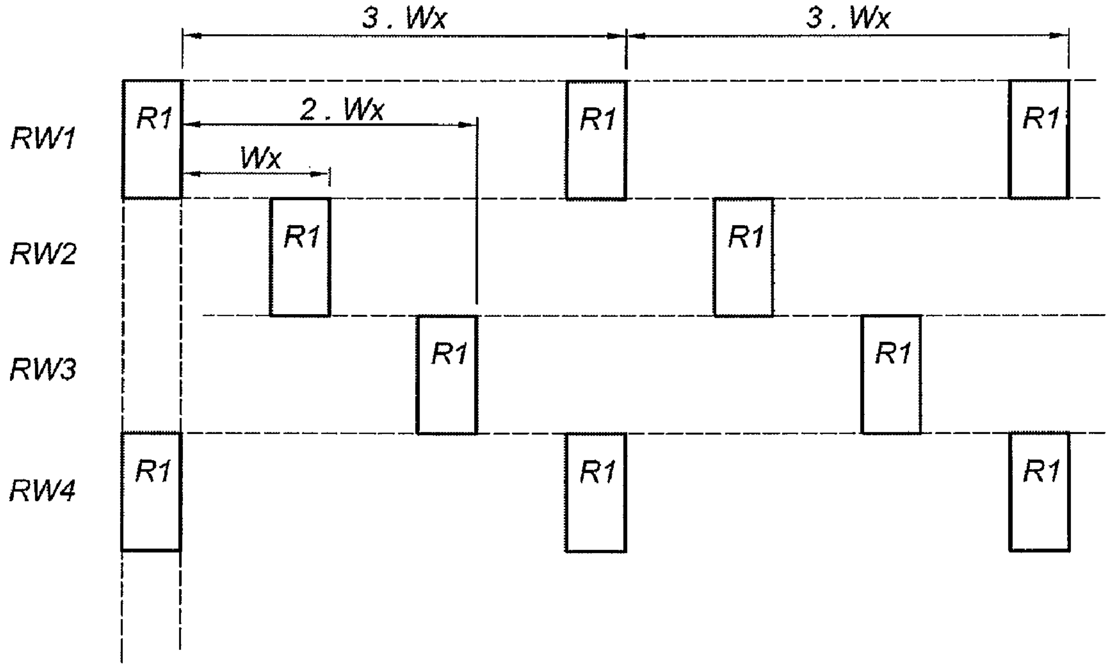
FIG. 6 depicts a perceived resolution of a dual view display using the embodiment of FIG. 5.

FIG. 6 depicts a perceived resolution of the combination of the row-rotated color filter CFR as shown in FIG. 5 and the straight barrier LB. Again, as in FIGS. 4*a* and 4*b*, only the red sub-pixels R1 of the first view V1 are addressed.

The distribution of the red sub-pixels for the row-rotated color filter design CFR is superior to that of the straight barrier LB combined with the conventional RGB stripe design of the first color filter CF1. As a result, the perceived resolution will increase with about the same amount as for the combination CF2+CB of the shifted barrier and the second color filter CF2. Note that the horizontal distance between red sub-pixels R1 is now Wx instead of 1.5 times Wx as shown in FIG. 4*b* for the combination CF2+CB of the shifted barrier CB and the second color filter CF2.

However, it is observed that contrary to the situation shown in FIG. 4*b*, oblique incident light (relative to the X-Z plane) does not give rise to crosstalk in the vertical direction. The sub-pixels for one view are assigned per column, like for the conventional case for the combination CF1+LB of the straight barrier LB and the first color filter CF1, where no crosstalk in the vertical direction is observed either.

In the situation of FIG. 6, depending on the vertical viewing angle an observer will only receive light coming from sub-pixels R1 assigned to the first view V1.

Figure 7:
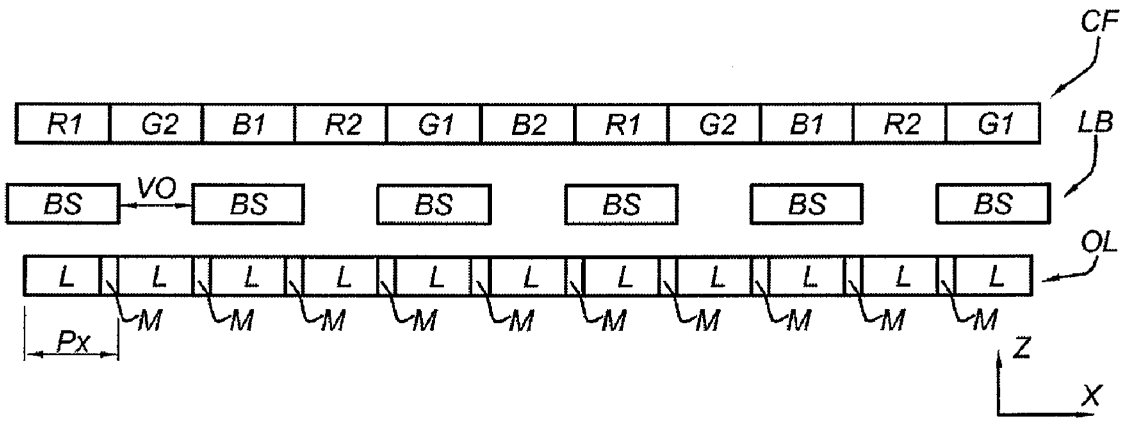
FIG. 7 shows schematically a cross section of a further embodiment of a dual view display in accordance with the present invention.

FIG. 7 shows schematically a cross section of a further embodiment of a dual view display in accordance with the present invention. In this embodiment, the light source is an array of organic light emitting diodes (OLEDs) indicated below as LED elements L.

In the horizontal cross-section as shown in FIG. 7, entities with the same reference number as shown in the preceding figures refer to the corresponding entities in the preceding figures.

In a first light emitting layer OL, the LED elements L are arranged in an array. Between the individual LED elements metal interconnection lines M may be located that extend in the direction Y (perpendicular to the YZ plane of the drawing). The LED elements L are each arranged to produce an individual light beam and can be addressed individually as a sub-pixel. In this example, the LED elements L are LEDs arranged for emission of 'white light' (i.e., an ensemble of light components with various wavelengths that produces at least a perception of white light).

Above the light emitting layer OL the straight barrier LB is located. Then above the straight barrier LB, the row-rotated color filter plate CFR is located. The row-rotated color filter plate CFR comprises color elements as described above with reference to FIG. 5 and FIG. 6. Note that in this embodiment, the color filter plate CFR per se is indicated without an array plate. Alternatively, instead of white light producing LED elements L, the LED elements L may be LED elements producing a (collimated) light beam of a particular color: e.g., red, green or blue. In that case, the color filter plate may be omitted and the OLED array OL will have a color element arrangement similar to color element arrangement of the row-rotated color filter CFR.

It is noted that the arrangement of OLEDs as shown is a so-called stack-up arrangement, emitting light along direction Z. It is conceivable that OLEDs may be arranged in another arrangement for emitting light along the direction Z (e.g., top emission type vs bottom emission type).

Further, it is noted that in other embodiments, OLEDs may comprise additional color elements next to the red, green and blue color elements. Such an additional color element may be for example, a white sub-pixel.

In a further embodiment, the dual view display device of the present invention may be arranged as a switchable display device using barrier technology to create 2D (two-dimensional) images in one mode and 3D (three-dimensional) images in another mode, the modes being switchable by a mechanism known in the art. In the 3D imaging mode the dual view of the first view V1 and the second view V2 according to the present invention can be generated. In the 3D mode the first view V1 is for example intended for viewing by the left eye, and the second view V2 by the right eye of an observer.

While specific embodiments of the invention have been described above, it will be appreciated that the invention may be practiced otherwise than as described. The descriptions above are intended to be illustrative, not limiting. It will be apparent to one skilled in the art that modifications may be made to the invention as described without departing from the scope of the claims set out below.

The invention claimed is:

1. A display device for displaying a first view (V1) and a second view (V2), the first view and the second view having respectively a first and a second horizontal viewing angle; the display device comprising:

a color generating layer, a barrier layer, and a light source;

the color generating layer comprising a plurality of color elements arranged in a two-dimensional array extending in a plurality of rows in a horizontal direction (X) and a plurality of columns in a vertical direction (Y);

the light source being arranged such that, during use, light generated by the light source may pass through an arrangement of the barrier layer and the color elements of the color generating layer;

the barrier layer being a straight barrier, comprising a barrier pattern of blocking structures and openings, and being arranged for providing the viewing angle of the first view and the viewing angle of the second view, and the color generating layer having a row-rotation arrangement of the color elements, wherein the color elements of a row are shifted one position to the left in comparison to an adjacent row above the row.

2. The display device according to claim 1, wherein in the color elements comprising at least red, green and blue color elements.

3. The display device according to claim 1, wherein, in each column of the color generating layer, the color elements of the at least red, green and blue color are in a repeating sequence.

4. The display device according to claim 1, wherein the color elements in each odd column are associated with one of the first and second views and the color elements in each even column are associated with another of the first and second views.

5. The display device according to claim 1, wherein the color elements in each row have a repeating interleaved row sequence.

6. The display device according to claim 1, wherein the light source is a backlight.

7. The display device according to claim 1, wherein the color generating layer is a color filter plate.

8. The display device according to claim 7, wherein the barrier layer is arranged between the light source and the color filter plate.

9. The display device according to claim 7, wherein the color filter plate is arranged between the backlight and the barrier layer.

10. The display device according to claim 1, wherein the display device comprises a light-switching layer comprising light switching elements that are individually associated with a single color element for controlling a transmission of light, during use, through that single color element and wherein the light switching elements are arranged for assigning one half of the plurality of color elements to the first view (V1) and another half of the plurality of color elements to the second view (V2).

11. The display device according to claim 1, wherein the light source is an array of light emitting devices, each of the light emitting devices being arranged for producing white light and being associated with a corresponding one of the color elements of the color generating layer.

12. The display device according to claim 11, wherein the light source comprises the color generating layer, each light emitting device being arranged as a color element for producing light of that color.

13. The display device according to claim 1, wherein a horizontal spacing between color elements of the same color is 1.5 times the horizontal pitch (Wx) of one color element.

14. The display device according to claim 2, wherein the color generating layer further comprises color elements of at least one additional color.

15. The display device according to claim 1, wherein the display device generates images in a three-dimensional mode, the first view (V1) being associated with a view for one eye of an observer, the second view (V2) being associated with the other eye of the observer.

16. The display device according to claim 15, wherein the display device is switchable between a two-dimensional mode and a three-dimensional mode.

17. A method for manufacturing a display device for displaying a first view (V1) and a second view (V2), the first view and the second view having a respective horizontal viewing angle; the method comprising:

providing a color generating layer, a barrier layer, and a light source;

the color generating layer comprising a plurality of color elements arranged in a two-dimensional array extending in a plurality of rows in a horizontal direction (X) and a plurality of columns in a vertical direction (Y);

the color elements comprising at least red, green and blue color;

arranging the light source in such a way that, during use, light generated by the light source may pass through an arrangement of the barrier layer and the color elements of the color generating layer;

providing in the barrier layer a straight barrier pattern of blocking structures and openings, the barrier layer being arranged for providing the viewing angle of the first view and the viewing angle of the second view; and arranging the color elements in the color generating layer in a row-rotation arrangement, wherein the color elements of a row are shifted one position to the left in comparison to an adjacent row above the row.

* * * * *